(12) United States Patent
Mozdzer et al.

(10) Patent No.: US 8,200,365 B2
(45) Date of Patent: Jun. 12, 2012

(54) METHOD FOR COMMITTING MATERIAL TO A MODULE OF AN INSERTING SYSTEM

(75) Inventors: Joseph M. Mozdzer, Shelton, CT (US); David J. Eaton, Newtown, CT (US); Kevin W. Baxter, Seymour, CT (US)

(73) Assignee: Pitney Bowes Inc., Stamford, CT (US)

( * ) Notice: Subject to any disclaimer, the term of this patent is extended or adjusted under 35 U.S.C. 154(b) by 245 days.

(21) Appl. No.: 12/478,840

(22) Filed: Jun. 5, 2009

(65) Prior Publication Data

US 2010/0312376 A1 Dec. 9, 2010

(51) Int. Cl.
*B65H 39/00* (2006.01)

(52) U.S. Cl. .......... 700/228; 270/58.06; 700/220

(58) Field of Classification Search .......... 700/213, 700/220, 228; 270/58.06, 58.07, 58.23; 271/3.17, 271/4.03, 182, 202
See application file for complete search history.

(56) References Cited

U.S. PATENT DOCUMENTS

| | | | |
|---|---|---|---|
| 4,942,535 A | 7/1990 | Francisco | |
| 4,962,623 A | 10/1990 | Francisco | |
| 4,970,654 A | 11/1990 | Francisco | |
| 4,992,950 A | 2/1991 | Francisco | |
| 5,003,485 A | 3/1991 | Francisco | |
| 5,146,587 A | 9/1992 | Francisco | |
| 5,182,798 A | 1/1993 | Francisco | |
| 5,185,866 A | 2/1993 | Francisco | |
| 6,572,097 B2* | 6/2003 | d'Agrella et al. | 271/182 |
| 2003/0057639 A1* | 3/2003 | Chapman et al. | 271/270 |

* cited by examiner

*Primary Examiner* — Leslie A Nicholson, III

(74) *Attorney, Agent, or Firm* — Brian A. Collins; Charles R. Malandra, Jr.; Steven J. Shapiro

(57) ABSTRACT

A method for maximizing the overall efficiency of an insertion system by running the system with the optimal balance between system throughput and potential for system stoppages. In other words, the system is capable of running at less than maximum throughput if running at such throughput is causing excessive amounts of system stoppages and thus, negatively impacting overall system efficiency. The foregoing is accomplished by an algorithm that controls the flow of material being processed by a particular section of the machine, or "module". This algorithm is capable of reducing the flow rate of material to, or within, that module if a problem arises downstream that may lead to a paper jam.

13 Claims, 4 Drawing Sheets

METHOD FOR COMMITTING MATERIAL TO A MODULE OF AN INSERTING SYSTEM

FIELD OF THE INVENTION

The invention relates generally to inserting machines, and more particularly to a method and system for increasing the throughput of machines that insert material into mail pieces.

BACKGROUND OF THE INVENTION

Inserter systems, such as those applicable for use with the present invention, are typically used by organizations such as banks, insurance companies and utility companies for producing a large volume of specific mailings where the contents of each mail item are directed to a particular addressee. Also, other organizations, such as direct mailers, use inserters for producing a large volume of generic mailings where the contents of each mail item are substantially identical for each addressee.

In many respects, the typical inserter system resembles a manufacturing assembly line. Sheets and other raw materials (other sheets, enclosures, and envelopes) enter the inserter system as inputs. Then, a plurality of different modules or workstations in the inserter system work cooperatively to process the sheets until a finished mail piece is produced. The exact configuration of each inserter system depends upon the needs of each particular customer or installation.

Typically, inserter systems prepare mail pieces by gathering collations of documents on a conveyor. The collations are then transported on the conveyor to an insertion station where they are automatically stuffed into envelopes. After being stuffed with the collations, the envelopes are removed from the insertion station for further processing. Such further processing may include automated closing and sealing the envelope flap, weighing the envelope, applying postage to the envelope, and finally sorting and stacking the envelopes.

The efficiency of an insertion system is measured by: (1) its ability to consistently singulate and feed sheets from a stack into an envelope without producing system problems resulting in system stoppages and (2) the rate at which the inserter produces finished mail pieces. It is desirable to have the inserter operate at high speed so that overall throughput of the insertion system is maximized. Thus, a reliable and fast inserter system results in more efficient and cost effective system. However, increasing the throughput of the inserter often has the resulting negative consequence of increasing the likelihood of system problems. An example of system problems are paper jams. Paper jams can also be caused by static electricity, adhesion/cohesion and frictional drag between the sheets, different physical or chemical properties of the sheets being fed, etc. When a paper jam occurred the inserter was stopped and the sheets already fed usually had to be removed from the inserter and discarded before the insertion system was restarted.

A disadvantage of the prior art is that sometimes difficult to remove the jammed sheets.

Another disadvantage of the prior art is that it is time consuming to remove the jammed sheets.

A further disadvantage of the prior art is that the jammed sheets and other partially processed sheets usually were discarded.

An additional disadvantage of the prior art is that a paper jam reduces the productivity of the system.

SUMMARY OF THE INVENTION

This invention overcomes the disadvantages of the prior art by maximizing the overall efficiency of the insertion system by running with the optimal balance between throughput and potential for system stoppages. In other words, the system is capable of running at less than maximum throughput if running at such throughput is causing excessive amounts of system stoppages and thus, negatively impacting overall system efficiency. The foregoing is accomplished by an algorithm that controls the flow of material being processed by a particular section of the machine, or "module". This algorithm is capable of reducing the flow rate of material to, or within, that module if a problem arises downstream that may lead to a paper jam.

The invention may accomplish the foregoing result by temporarily reducing the rate that material is processed by the system when a potential problem is expected to occur and increasing the processing rate when the problem no longer exists. For example when sheets are being inserted into an envelope and an envelope is not yet available at the insertion station; the system would reduce the rate at which sheets were handed off to the insertion module, so that the envelope would be available when the sheet arrived. If the sheet delivery rate was not slowed down, the sheets would arrive at the insertion station and no envelope would be present, causing a paper jam. The invention may also reduce the delivery rate of the envelopes so that the sheets would be available when the envelope arrived. If the envelope were not slowed down the envelope would arrive at the insertion station and no sheet would be presented causing a paper jam. The invention also permits someone to change the rate at which material is processed by a module while the system is running.

The algorithm decides if material can be accepted by a downstream module from its neighboring upstream module or modules. The algorithm is executed whenever any potential trigger for accepting new material occurs. The algorithm has a configurable part and a non-configurable part. The non-configurable part evaluates material that is pending entry into a module, and looks for system conditions that would prevent the currently selected job from running properly if that material were to be released into the module at that time. If such conditions are found, the module avoids accepting the material that would cause the problem (and waits for the next trigger before running the algorithm again). The configurable part also evaluates the material pending entry to the module against system conditions, and also avoids accepting material if any of these conditions are true, however this part differs in that 1) under optimal conditions (i.e. material slippage is within normal tolerance), the job would still run properly if these check(s) were ignored, and 2) the set of checks that are performed (if any) depends on a setting external to the algorithm itself. This allows an external setting to influence whether no configurable checks are performed (to maximize throughput) or some set of configurable checks are performed to provide fault tolerance of varying degree.

The invention permits an end user or service person to adjust the configurable part of the algorithm to maximize efficiency for a particular job that is not running well with default settings.

The invention also permits a separate part of the system software to adjust the configurable part of the algorithm. This allows the system to automatically detect problems and maximize efficiency.

An advantage of this invention is that the algorithm is able to control the flow of material to eliminate paper jams when a downstream problem is sensed.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention. As shown throughout the drawings, like reference numerals designate like or corresponding parts.

DETAILED DESCRIPTION OF THE PRESENT INVENTION

Figure 1:
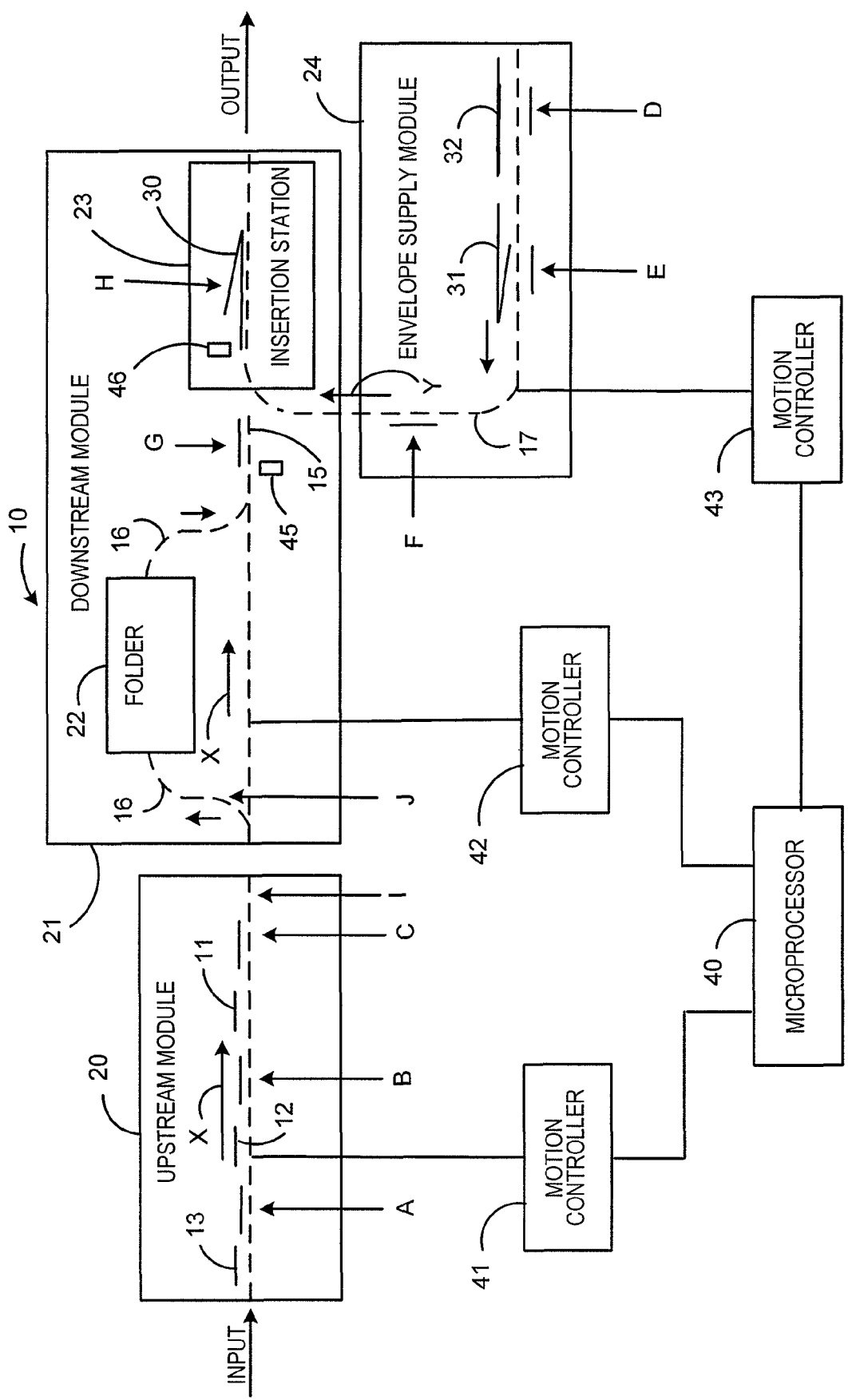
FIG. 1 is a block diagram of the modules of an insertion system.
Figure 2:
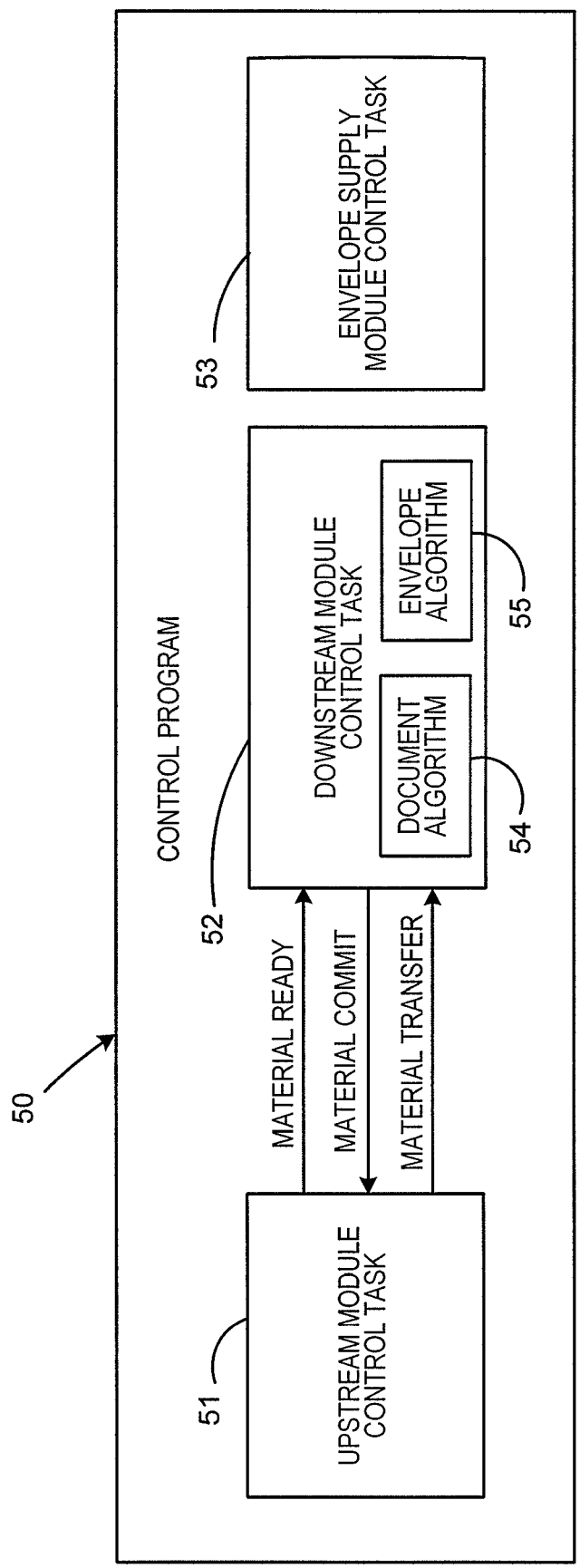
FIG. 2 is a block diagram of the control program running on microprocessor 40 of FIG. 1.
Figure 3:
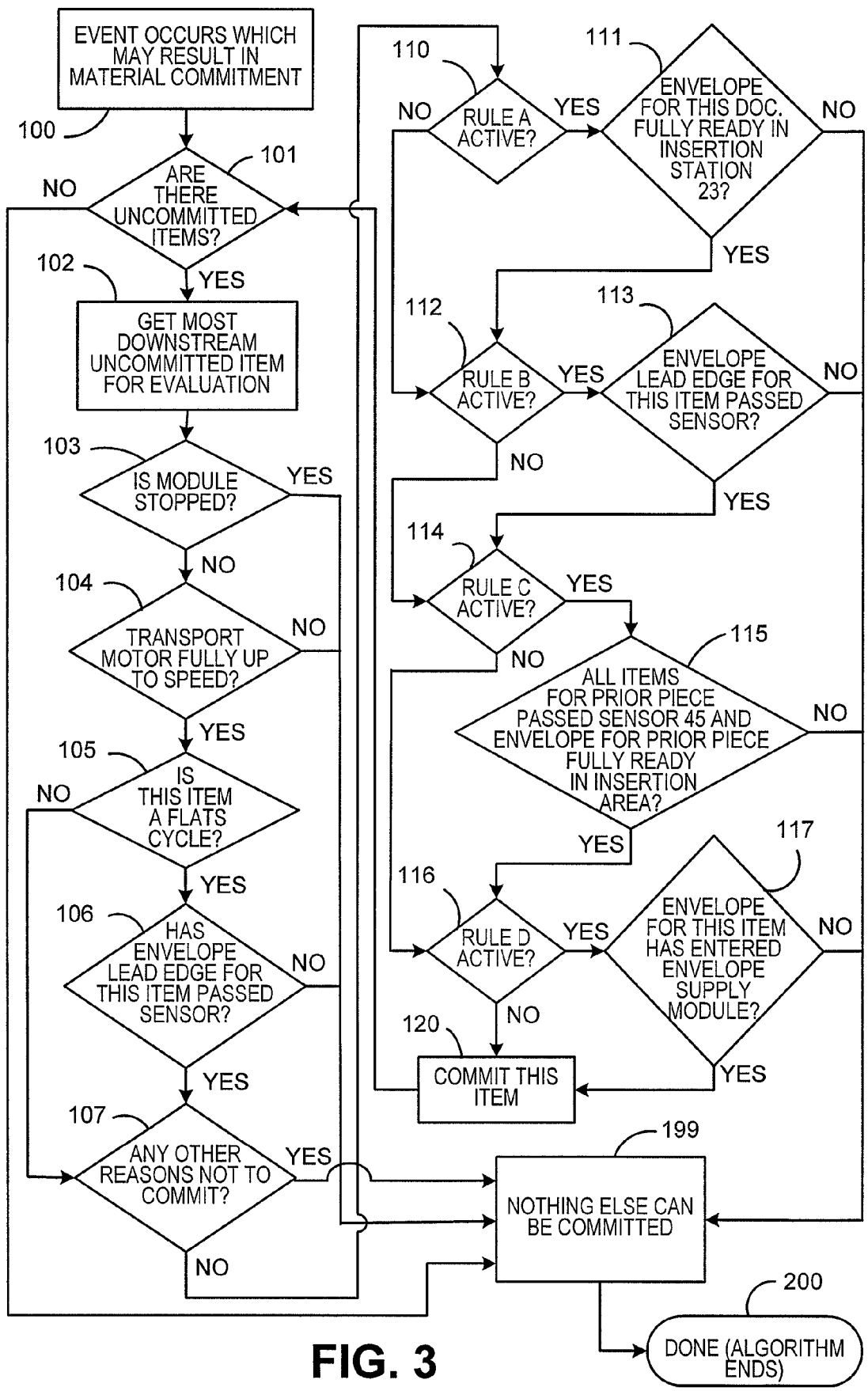
FIG. 3 is a flow chart of the document commitment algorithm 54 that in downstream module control task 52 of FIG. 2.

In describing the present invention, reference is made to the drawings, wherein similar reference numerals in FIGS. 1-3 designate similar elements in the various views.

Referring now to the drawings in detail and more particularly to FIG. 1 the insertion system 10 is shown after documents 11, 12 and 13 entered upstream module 20 through the input of module 20, or after being fed from a tray (not shown) attached to upstream module 20. Documents 11, 12 and 13 are single sheets of documents or collated sets of documents that will be inserted into individual envelopes. Documents 11, 12 and 13 travel respectively along path 15 through upstream module 20 in the direction indicated by arrow X, by being moved by a conveyor and/or multiple sets of rollers.

The documents 11, 12 and 13 respectively advance along path 15 into downstream folder accumulator inserter module 21 if the documents are to remain unfolded and the documents 11, 12 and 13 respectively advance along path 16 into downstream module 21 and folder 22 if the documents are going to be folded by folder 22. Folded documents 11, 12 and 13 or unfolded documents 11, 12 and 13 travel along path 15 to insertion station 23.

Envelope supply module 24 respectively feeds envelopes 30, 31, and 32 along path 17 in the direction indicated by arrow Y, by being moved by a conveyor and/or multiple sets of rollers. Envelopes enter module 24 with a closed flap, exit module 24 with an open flap and proceed to insertion station 23 via paths 17 and 15. At insertion station 23 when document 11 arrives at insertion station 23 it will be inserted into envelope 30. Envelope 30 containing document 11 will then be output into a tray or other module such as a stacker (not shown).

Microprocessor 40 is coupled to motion controllers 41, 42 and 43 and motion controller 41 is coupled to upstream module 20. Motion controller 42 is coupled to downstream module 21 and motion controller 43 is coupled to envelope supply module 24. Microprocessor 40 executes a control program which is described in the description of FIG. 2 that interfaces with motion controllers 41, 42 and 43. Microprocessor 40 also executes an algorithm described in the description of FIG. 3 that controls the transfer of documents 11, 12 and 13 in upstream module 20 to downstream module 21 so that the arrival of documents 11, 12, and 13 at insertion station 23 is properly synchronized with the arrival of envelopes 30, 31, and 32 at insertion station 23.

Motion controller 41 manages motors, sensors, and actuators that are used for feeding and collating documents 11, 12 and 13, moving documents 11, 12 and 13 along path 15 and detecting documents 11, 12 and 13 at various points along path 15. Motion controller 42 manages motors, sensors, and actuators that are used for the folding of documents by folder 22 and the moving of documents 11, 12 and 13, and envelopes 30, 31 and 32 into insertion station 23. Sensor 45 senses documents that are about to be inserted into an envelope. Sensor 46 senses the presence of envelopes in insertion station 23. Sensor 46 is also capable of running in burn through mode to look through the envelope and determine whether or not a document is completely inserted within the envelope. A burn through sensor is described in U.S. Patent Application Ser. No. 60/795,819 entitled "Envelope Sensor Burn-Thru Level Sensing" and application Ser. No. 11/787,041 "Method of Sensing Pack Insertion at Crease Line of Envelope" which is owned by the assignee of this application Pitney Bowes Inc. and is hereby incorporated by reference. Motion controller 43 manages motors, sensors, and actuators that are used to move empty envelopes, open envelope flaps and move envelopes 30, 31 and 32 to downstream module 21.

Locations A, B, C, D, E and F are spaces along paths 15 and 17 that are used to temporarily park documents 11, 12 and 13 and envelopes 30, 31 and 32 when the flow of documents or envelopes have to be restrained by this invention for any reason. Location G is a space along path 15 where downstream module 21 can accumulate multiple documents for insertion into a single envelope. Location H is a space along path 15 where documents 11, 12 and 13 are inserted into envelopes 30, 31 and 32.

FIG. 2 is a block diagram of the control program running on microprocessor 40 of FIG. 1. Control program 50 contains an upstream module control task 51, a downstream module control task 52 and an envelope supply control task 53. Upstream module control task 51 communicates with motion controller 41 and instructs controller 41 in the moving of documents along path 15. Motion controller 41 provides feedback to upstream module control task 51 regarding the position and state of documents along path 15 using sensors (not shown). Downstream module control task 52 communicates with motion controller 42 and instructs controller 42 in the moving of documents along paths 15 and 16, and the insertion of documents into envelopes at location H (FIG. 1). Motion controller 42 provides feedback to downstream module control task 52 regarding the position and state of documents and envelopes along paths 15 and 16, using sensors 45 or 46. Envelope supply module control task 53 communicates with motion controller 43 and instructs controller 43 in the moving of envelopes along path 17. Motion controller 43 provides feedback to envelope supply module 53 regarding the position and state of envelopes along path 17 using sensors (not shown). Upstream module control task 51 is coupled to downstream module control task 52 and upstream module control task 51 transmits and receives task messages from downstream module control task 52. Material Ready, Material Commit and Material Transfer messages are exchanged between modules 51 and 52, and between modules 53 and 52. Downstream module control task 52 contains an algorithm 54 that controls document flow from upstream module task 51 to downstream module control task 52. Algorithm 54 is more fully described in the description of FIG. 3.

Downstream module control task 52 contains an algorithm 55 that controls envelope flow from envelope supply module task 53 to downstream module control task 52. Algorithm 55 is more fully described in the description of FIG. 4.

The material ready message is always sent from the more upstream module control task to the more downstream module control task, i.e., module 51 to module 52, or module 53 to module 52. In the foregoing message, upstream module control task 51 is indicating that it wants to hand off a document 11 to downstream module 21 or envelope supply module control task 53 is indicating that it wants to hand off an envelope 31 to downstream module 21.

The message is transmitted as soon as upstream module control task 51 knows which document 11, 12 or 13 will definitely be the next document or envelope to be handed off e.g., there is no chance that this document will be placed in a divert bin (not shown) instead of continuing along path 15, and all information that downstream module 21 will need to know about the document for its commit decision such as number of sheets, length, target envelope type, fold type is known.

Upstream module 20 cannot physically release the document or envelope to the downstream module 20 until the downstream module control task 52 grants permission to the upstream module control task 51 to do so. Therefore, the upstream module control task 51 must internally plan on stopping the document at parking location A, B, or C of upstream module 20 until such time as permission is granted. It is important to note that the document may not yet have arrived at its parking location (i.e. it is located upstream of the desired parking location and still moving in direction X along path 15), so if downstream module control task 52 grants permission for the upstream module control task 51 to release the document before it gets to that parking location, the document will never have to be parked, and the through put of this system will be at its highest.

The material commit message is always sent from downstream module control task 52 to upstream module control task 51 or envelope supply module control task 53. The foregoing message is sent, when downstream module control task 52 guarantees that downstream module 21 is able to accept the document or envelope previously offered by upstream module control task 20 with a Material Ready message. This is how downstream module control task 52 grants permission to upstream module control task 51 or envelope supply module control task 53 to physically deliver the document or envelope to downstream module 21. Downstream module control task 52 transmits the foregoing message to upstream module control task 51 in accordance with the algorithm described in FIG. 3.

The Material Transfer message is transmitted from upstream module control task 51 to downstream module control task 52 when the document that has been committed with a Material Commit message physically reaches a fixed transfer point along paper path 15. The Material Transfer message is transmitted from envelope supply module control task 53 to downstream module control task 52 when the envelope that has been committed with a Material Commit message physically reaches a fixed transfer point along paper path 17. The aforementioned transfer point can vary depending on the type of document being transferred and the path it will take, however this transfer point is always known by the downstream module control task 52. For instance, if document 11 is not going to be folded, the material transfer message will be sent from upstream module control task 51 to downstream module control task 52 when document 11 reaches transfer point I on paper path 15, and document 11 continues moving along paper path 15. Furthermore, if document 11 is going to be folded, the material transfer message will be sent from upstream module control task 51 to downstream module control task 52 when document 11 reaches transfer point J on paper path 16, and document 11 continues moving along paper path 16 to folder 22. Once the Material Transfer message is received by downstream module control task 52, logical ownership of the document (in software) or envelope (in software) transfers from upstream module control task 51 or envelope supply module control task 53 to downstream module control task 52. The Material Transfer message is the only message of the three messages just described that always occurs at a fixed time relative to the physical location of a document.

For any particular document, the normal sequence of messages is Material Ready, then Material Commit, then Material Transfer. Multiple sets of documents can be in the process of being handed off simultaneously, however for any individual document, the messages always occur in that order.

FIG. 3 is a flow chart of the algorithm 54 that runs in task 52 of control program 50 that runs on microprocessor 40 of FIG. 1. The algorithm 54 is used to control when the downstream module control task 52 sends the material commit message to upstream module control task 51 for documents that are ready (i.e. documents for which the material ready message has been sent from upstream module control task 51 to downstream module control task 52). Earlier commitment of documents will generally lead to improved system throughput, since a document in upstream module 20 will not need to be temporarily parked at a parking location A, B or C if the material commit message is received by upstream module control task 51 prior to the document having reached its designated parking location. Additionally, throughput is also improved due to the fact that a document no longer logically occupies a parking location once it has been committed, thereby making more parking locations available for feeding additional documents into upstream module 20.

The algorithm 54 begins in block 100 when an event occurs which may result in a document commitment, e.g., has an envelope become available at location F, has insertion completed at location K, has a document received from module 20 reached sensor 45, has an envelope received from module 24 reached sensor 46. Next decision block 101 decides whether or not there are any uncommitted documents. If block 101 decides that there are no uncommitted documents, the algorithm goes to block 199, nothing else can be committed, and the algorithm ends in block 200. If block 101 decides that there are uncommitted documents the algorithm goes to block 102 to obtain the most downstream uncommitted item for evaluation, i.e., document 11 from module 20. Next the algorithm goes to decision block 103.

Decision block 103 determines whether or not the downstream module is stopped. If decision block 103 determines that the downstream module is stopped the algorithm goes to block 199. If decision block 103 determines that the downstream module is not stopped the algorithm goes to block 104. Block 104 determines whether or not the transport motor used in the motion controller for moving the document or envelope under consideration is up to full speed. If decision block 104 determines that the downstream module is not fully up to speed the algorithm goes to block 199. If decision block 104 determines that the downstream module is fully up to speed the algorithm goes to decision block 105. Block 105 determines whether or not the document or envelope under consideration is in a flats cycle. Flats cycles use a long envelope and differ from other cycles in that the envelope takes longer to fully reach its position inside insertion station 23, and the document to be inserted does not have to travel in path 16 through folder 22. If Block 105 determines that the document under consideration is not in a flats cycle the algorithm goes to decision block 107. If Block 105 determines that the document under consideration is in a flats cycle the algorithm goes to block 106.

Decision block 106 determines whether or not the leading edge of the envelope that will contain the document under consideration has passed sensor 46. If block 106 determines that the envelope has not passed sensor 46, the algorithm goes to block 199. If block 106 determines that the envelope has passed sensor 46, the algorithm goes to decision 107. Decision block 107 determines whether or not there are any other reasons not to commit. If block 107 determines that there are no other reasons not to commit the algorithm goes to block 110. If block 107 determines that there are other reasons not to commit the algorithm goes to decision block 199. Block 110 determines whether or not Rule A is active. If block 110 determines that Rule A is not active the algorithm goes to decision block 112. If block 110 determines that Rule A is active the algorithm goes to decision block 111. Decision block 111 determines whether or not the envelope for the document under consideration is fully ready for insertion in insertion station 23.

If block 111 determines that the envelope for the document under consideration is not ready for insertion in insertion station 23, the algorithm goes to block 199. If block 111 determines that the envelope for the document is ready for insertion in insertion station 23, the algorithm goes to decision block 112. Block 112 determines whether or not Rule B is active. If block 112 determines that Rule B is not active the algorithm goes to decision block 114. If block 112 determines that Rule B is active the algorithm goes to decision block 113. Decision block 113 determines whether or not the leading edge of the envelope for the document under consideration has passed sensor 46. If block 113 determines that the leading edge of the envelope has not passed sensor 46 the algorithm goes to block 199. If block 113 determines that the leading edge of the envelope has passed sensor 46 the algorithm goes to decision block 114.

Block 114 determines whether or not Rule C is active. If block 114 determines that Rule C is not active the algorithm goes to decision block 116. If block 114 determines that Rule C is active the algorithm goes to decision block 115. Decision block 115 determines whether or not all documents for the prior mail piece have passed sensor 45, and the envelope for the prior piece is fully ready in insertion station 23. If block 115 determines that all documents for the prior mail piece have not passed sensor 45 or the envelope for the prior piece is not fully ready in insertion station 23 the algorithm goes to block 199. If block 115 determines that all documents for the prior mail piece have passed sensor 45 and the envelope for the prior piece is fully ready in insertion station 23 the algorithm goes to decision block 116.

Block 116 determines whether or not Rule D is active. If block 116 determines that Rule D is not active the algorithm goes to block 120. If block 116 determines that Rule D is active the algorithm goes to decision block 117. Decision block 117 determines whether or not the envelope for this document has entered envelope supply module 24. If block 117 determines that the envelope for this document has not entered envelope supply module 23 the algorithm goes to block 199. Then the algorithm will end in block 200. If block 117 determines that the envelope for this document has entered envelope supply module 23 the algorithm goes to block 120. Block 120 commits this item, i.e. the material commit message for the document under consideration is sent from downstream module control task 52 to upstream module control task 51, and the item is no longer considered to be uncommitted. Then the program goes back to the input of block 101.

Blocks 103, 104, 105, 106, and 107 of FIG. 3 are considered to be the first set of logic rules that prevent the commitment of documents in cases where the system 10 would be known to jam if the first set of logic rules were not executed. The system 10 operates at maximum throughput if the first set of logic rules is the only set that is executed. Blocks 111, 113, 115, and 117 are considered to be the second set of logic rules. Executing one or more of the second set of logic rules can prevent certain types of jams from occurring, by reducing the throughput of system 10. The foregoing will lead to greater efficiency of system 10 since system 10 is still processing documents instead of jamming frequently.

An example of the foregoing is that in the second set of logic rules if Rule B was activated because envelopes were detected to be slipping along path 17 between location F and inserter station 23. Rule B would prevent a paper jam from occurring due to documents 11, 12 or 13 arriving at inserter station 23 prior to an envelope 30, 31 or 32 being available because it would prevent documents 11, 12 or 13 from exiting upstream module 20 prior to the lead edge of an envelope 30, 31 or 32 being detected at sensor 46. Consequently, the throughput of system 10 may be reduced. However, the overall efficiency of system 10 would not suffer because a paper jam was avoided and there would be no system 10 down time.

The method by which particular Rules in the second set of logic rules are activated may be by a user of a control panel (not shown) coupled to microprocessor 40. Another method by which Rules in the second set of logic rules are activated may be by system 10 automatically determining the set of Rules to use. The foregoing may be accomplished by system 10 measuring the travel of documents 11, 12 or 13 and/or envelopes 30, 31 or 32 along paths 15, 16 and 17 using sensors and comparing the measured travel time against expected travel time to detect paper slippage.

Figure 4:
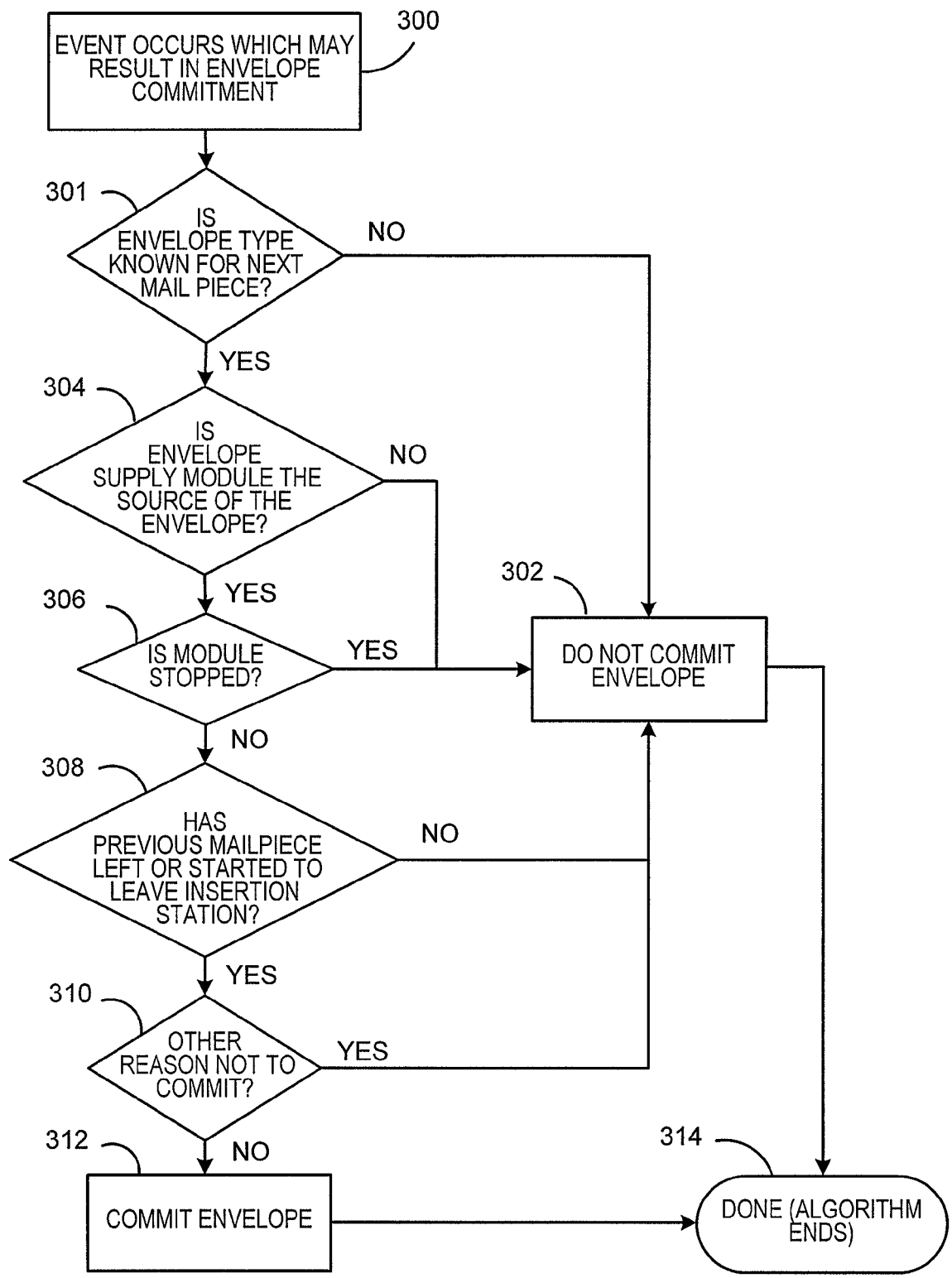
FIG. 4 is a flow chart of the envelope commitment algorithm 55 that in downstream module control task 52 of FIG. 2.

FIG. 4 is a flow chart of the envelope commitment algorithm 55 that executes in downstream module control task 52 of FIG. 2. The algorithm 55 begins in block 300 when an event occurs which may result in a envelope commitment, e.g., has an envelope become available at location F, has a completed mailpiece started to leave insertion station 23, has the envelope type for the next document to be inserted become known. Next the algorithm goes to decision block 301. Block 301 determines whether or not the correct envelope type and size is known for the document that is going to be inserted to form the next mail piece. If block 301 determines that the correct envelope type and size is not known for the document that is going to be inserted to form the next mail piece the algorithm goes to block 302 do not commit envelope. If block 301 determines that the correct envelope type and size is known for the document that is going to be inserted to form the next mail piece the algorithm goes to block 304. Block 304 decides whether or not envelope supply module 24 is the source of the envelope. If block 304 decides that envelope supply module 24 is not the source of the envelope the algorithm goes to block 302 do not commit. If block 304 decides that envelope supply module 24 is the source of the envelope the algorithm goes to block 306. Block 306 determines whether or not module 21 is stopped. If block 306 determines that module 21 is stopped the algorithm goes to block 302 and does not commit the envelope. If block 306 determines that module 24 is not stopped the algorithm goes to block 308.

Block 308 determines whether or not a previous document was inserted into an envelope to form a mail piece has left or started to leave insertion station 23. If block 308 determines that a previous mail piece has not left or started to leave insertion station 23 the algorithm goes to block 302 and does not commit an envelope. If block 308 determines that a previous mail piece has left or started to leave insertion station 23 the algorithm goes to block 310. Block 310 determines whether or not there is another reason not to commit an envelope. If block 310 determines that there is another reason not to commit an envelope the algorithm goes to block 302 and does not commit an envelope. If block 310 determines that there is no reason not to commit an envelope the algorithm goes to block 312 and commits the envelope. Then the algorithm ends in block 314.

The above specification describes a new and improved method for controlling the flow of material being processed by the inserter by utilizing the available up steam parking places to temporarily hold the material being processed if a problem arises downstream. It is realized that the above description may indicate to those skilled in the art additional ways in which the principles of this invention may be used without departing from the spirit. Therefore, it is intended that this invention be limited only by the scope of the appended claims.

What is claimed is:

1. A method for running a paper handling machine with a balance between paper throughput and paper handling problems with the machine, the method comprising the steps of:
    using a control algorithm to determine when paper is permitted to be transferred from an upstream module to a downstream module by utilizing a set of logic rules,
    wherein a first set of logic rules operates the machine at maximum throughput if no problem is encountered moving paper through the machine and a second set of logic rules operates the machine at less than maximum throughput if a problem is expected to be encountered moving paper through the machine.

2. The method claimed in claim 1, wherein the first set of logic rules causes transfer of the paper from the upstream module to the downstream module to occur at maximum speed.

3. The method claimed in claim 1, wherein the second set of logic rules delays transfer of the paper from the upstream module to the downstream module in response to varying conditions detected by the downstream module.

4. The method claimed in claim 1, wherein the second set of logic rules delays transfer of the paper from the upstream module to the downstream module in response to information received from another module in the machine.

5. The method claimed in claim 1, wherein the upstream module feeds documents and envelopes.

6. The method claimed in claim 1, wherein the second set of logic rules is programmable by a user of the machine.

7. The method claimed in claim 1, wherein the second set of logic rules is programmed by a user for a specific job that is stored on the machine.

8. The method claimed in claim 1, wherein which rule or rules of the second set of logic rules are used is determined by information received from sensors in the machine.

9. The method claimed in claim 1, wherein which rule or rules of the second set of logic rules are used is determined by analyzing the problems that result in stoppages of the machine.

10. The method claimed in claim 1, wherein the second set of logic rules adjusts the throughput of the machine when paper slippage is detected.

11. The method claimed in claim 1, wherein the second set of logic rules is determined automatically by the machine.

12. The method claimed in claim 1, wherein the expected problem is a paper jam.

13. The method claimed in claim 1, wherein the second set of logic rules adjusts the rate at which the paper is presented from the upstream module to the downstream module.

* * * * *